United States Patent
Jiang (10) Patent No.: US 9,451,082 B2
(45) Date of Patent: Sep. 20, 2016

(54) SOCIAL COMMUNICATION SYSTEM (71) Applicant: Hongming Jiang, Zhejiang (CN)

(72) Inventor: Hongming Jiang, Zhejiang (CN)

(*) Notice: Subject to any disclaimer, the term of this patent is extended or adjusted under 35 U.S.C. 154(b) by 0 days.

(21) Appl. No.: 14/780,487

(22) PCT Filed: Mar. 26, 2014

(86) PCT No.: PCT/CN2014/074132
§ 371 (c)(1),
(2) Date: Sep. 25, 2015

(87) PCT Pub. No.: WO2014/154144
PCT Pub. Date: Oct. 2, 2014

(65) Prior Publication Data
US 2016/0044163 A1 Feb. 11, 2016

(30) Foreign Application Priority Data

Mar. 27, 2013 (CN) .......................... 2013 1 0110818

(51) Int. Cl.
H04M 1/56 (2006.01)
H04M 15/06 (2006.01)
H04M 3/42 (2006.01)

(52) U.S. Cl.
CPC ... *H04M 3/42042* (2013.01); *H04M 2203/655* (2013.01)

(58) Field of Classification Search
CPC .................. G06F 17/30218; G06F 17/30029; G06Q 10/10; G06Q 30/02; G06Q 50/01; G01C 15/01; G01S 19/14; G01S 19/35; G01S 19/48; A61B 5/00; H04L 67/02; H04L 67/306; H04L 12/2834; H04L 12/2898; H04L 63/0428; H04L 63/062; H04L 63/0807; H04L 63/0823; H04L 63/166; H04L 67/22
USPC ............ 379/142.01, 142.04, 142.05, 142.06, 379/142.14, 142.17, 88.19, 88.21, 88.23, 379/93.17, 93.18, 93.23, 242, 243, 245, 379/246, 247; 370/352–356; 455/414.1, 455/414.3, 414.4, 415
See application file for complete search history.

(56) References Cited

U.S. PATENT DOCUMENTS

2011/0213785 A1* 9/2011 Kristiansson .......... G06Q 10/10
707/748

(Continued)

FOREIGN PATENT DOCUMENTS

| CN | 1491062 | 4/2004 | ............. H04L 12/24 |
| CN | 101252701 | 8/2008 | ............. H04L 29/06 |
| CN | 101437207 | 5/2009 | ............. H04M 3/42 |

*Primary Examiner* — Binh Tieu
(74) *Attorney, Agent, or Firm* — Hayes Soloway P.C.

(57) ABSTRACT

A social communication system, comprising a telephone name parsing system which parses a name to a corresponding telephone number or parses a telephone number to a corresponding name during communication. The telephone name parsing system comprises a user identity management unit, a user telephone number unit, a user equipment number unit, a user name unit, a name detection unit, a user number name comparison table, a telephone management unit and a synchronization unit. The communication connection between any two users or among a plurality of users firstly passes through the telephone name parsing system. The telephone name parsing system enables each user to select to pack into a data packet the information and attributes disclosed to an opposite user of this communication connection, and displays same to the opposite user.

11 Claims, 4 Drawing Sheets

(56) References Cited

U.S. PATENT DOCUMENTS

| | | | | |
|---|---|---|---|---|
| 2012/0190386 A1* | 7/2012 | Anderson | ............. | G01C 15/04 455/456.3 |
| 2015/0074259 A1* | 3/2015 | Ansari | ............... | H04L 67/2838 709/224 |
| 2015/0074407 A1* | 3/2015 | Palmeri | ................ | H04L 63/166 713/171 |

* cited by examiner

SOCIAL COMMUNICATION SYSTEM

FIELD OF THE INVENTION

The present invention belongs to the field of telecom communications.

BACKGROUND OF THE INVENTION

Steve Jobs reinvent mobile phone through iPhone in 2007, and open the gate of the global mobile Internet. In the age of smart phones, emerging new IM (Instant Messenger) tools, such as iMessage, WhatsApp, Line, Talk, WeChat, Weibo (China Twitter) and so on. Because it is free or very low prices, sending text messages (even voice messages) to each other use these new IM tools, and have better user experience. It is huge impact to traditional SMS services, and voice services, provided by telecommunication carriers. Telecom companies urgently need new product and new technology to save the SMS and voice services, against OTT (over the top) product of Internet companies such as WhatsApp and WeChat etc.

Present invention will reinvent "SMS" and "Phone Call", founding a new social communication system.

CONTENTS OF THE INVENTION

A social communication system, comprising a "telephone name resolution system", parsing user name to corresponding phone number, or parses telephone number to corresponding user name during communication, and communication connect first access to "telephone name resolution system";

"telephone name resolution system" comprising "user name unit", "user name unit" accept user edit; each user create one or a plurality of "user name unit" for their each own telephone number; each "user name unit" comprising one or a plurality of editable items, each editable item comprising one or a plurality of attributes;

"telephone name resolution system" gathering every user's "user name unit", and generate "User Name-User Telephone Number Comparison Table";

"telephone name resolution system" comprising "user identity management unit", "user telephone number unit", "user device number unit", "user name unit", "user name detect unit", "user name-user telephone number comparison table", "phone call management unit", and "synchronization unit";

"telephone name resolution system" bring in "communication connect information", "communication connect information" comprising: one or a plurality of editable items of "request user information"; one or more custom "communication connect type"; one or a plurality of editable items of "target user information".

Abovementioned social communication system, comprising procedures of communication:

"telephone name resolution system" bring in "communication connect information", "telephone name resolution system" detecting if the target user is all digital numbers;

if the target user is all digital numbers, use the digital numbers to set up a communication connect;

if the target user is not all digital numbers, parsing target user name to corresponding telephone number, base on "user name-user telephone number comparison table"; and use the corresponding telephone number to set up a communication connection.

Abovementioned social communication system, comprising procedures of communication:

"telephone name resolution system" bring in "communication connect information", "telephone name resolution system" detecting if request user has user-defined "communication connect request information" items, except request user's telephone number;

if request user has no user-defined "communication connect request information" items, use telephone number direct set up a communication connection;

"telephone name resolution system" detecting if request user has default setting of "communication connect request information" items;

if request user has default setting items, load the default setting items of "communication connect request information";

if request user has no default setting items, add the "communication connect request information" items, that user individually set for this communication connect request;

display all user added "communication connect request information" items during communication connection.

Abovementioned social communication system, "request user information", comprising request user name, request user telephone number, request user photographs, request user status, request user location, request user communication status, request user identity validation information, request user age, request user gender, and all editable items or selected items in request user's "user name unit";

"target user information", comprising target user name, target user telephone number, target user photographs, target user status, target user location, target user communication status, target user identity validation information, target user age, target user gender, and all editable items or selected items in target user's "user name unit";

request "communication connect type", comprising telephone call, messages, video calls, text chat, voice chat, multimedia communication, search user, view user's information.

Abovementioned social communication system, the "telephone name resolution system" comprising "user identity management unit", store information of user pass or not pass real identity authenticate;

detecting whether request user and target user pass real identity authenticate, while set up a communication connect;

and add a mark to request user and target user, show they pass or not pass real identity authenticate in this communication connection.

Abovementioned social communication system, user configure privacy attribute of each their own "user name unit", or separate set privacy attribute of each editable item of each their own "user name unit";

privacy attribute comprising public to everyone, close to everyone, public to select contact people, public to one or a plurality of people who fit in with user set conditions. Abovementioned social communication system, the "telephone name resolution system" comprising "telephone call management unit";

"telephone call management unit" custom each "user name unit" these options: start communication, accept communication, block communication, disconnect communication, save communication content;

and custom each option's time range, location area, type class, target scope, number of times, and frequency;

"telephone call management unit" suspend, or completely block all communication connect of a user who are dragged to blacklist, or are reported crime by other over setting number users;

"telephone call management unit" also automatic call the police, and record number of times of be dragged to blacklist, be reported crime, and be called the police, to this user's "user identity management unit".

Abovementioned social communication system, have function of search user by location, by age, by gender, by user identity attribute;

and have function of user evaluate and score each other.

Abovementioned social communication system, the "telephone name resolution system" comprising "synchronization unit", synchronization "user name unit" on server and "user name unit" on user's terminal device;

synchronization user contact address book on server and user contact address book on user's terminal device;

synchronization user's status to one or more other users, who are this user choose to public state, and also set to accept this user's update status.

Abovementioned social communication system, the social communication system, comprising standard protocol of communication connect information, standardize Rich-Content and Multimedia-Content of "request user information", "communication connect types", and "target user information";

and standardize these Rich-Contents and Multimedia-Contents unified standard format during edit, transmission, and display, both on communication network and communication terminal;

Abovementioned social communication system, the social communication system, comprising new contact address book software on communication terminal, new dial-up software on communication terminal, new message software on communication terminal;

new contact address book software on communication terminal, comprising function of edit, display and store "user name unit" on communication terminal;

new contact address book software, new dial-up software, and new message software on communication terminal support standard protocol of communication connect information;

new message software, support set each message public scope and set each message length.

BRIEF DESCRIPTION OF THE DRAWINGS

For the skilled person in the field, from the following detailed description of drawings, can clearer understanding present invention, the abovementioned advantages will become more apparent, including.

BRIEF DESCRIPTION OF SYMBOLS

1. Feature phone
2. Smart phone
3. Fixed telephone
4. Smart watch which have call function
5. Communication network
6. "telephone name resolution system"
601 Root server of "telephone name resolution system"
602 Mirror server of "telephone name resolution system"
611 "user identity management unit"
612 "user telephone number unit"
613 "user device number unit"
614 "User name unit"
615 "user name detect unit"
616 "user name-user telephone number comparison table"
617 "phone call management unit"
618 "synchronization unit"
701 Generate a communication connect request
702 communication connect request access to "user name detect unit"
703 Detect whether target user's name is all digital numbers
704 Search target user's phone number
801 Request user identity authentication
802 Target user identity authentication
901 Set up communication connect
1001 Detect whether user has added information items except telephone number
1002 Detect whether user has a default setting
1003 Rich-Content call information

DETAILED DESCRIPTION OF THE EMBODIMENTS

Figure 1:
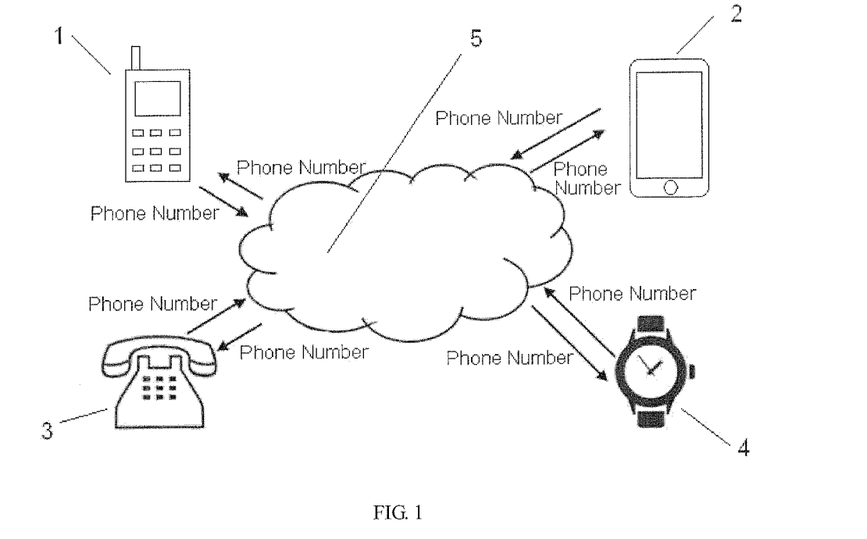
FIG. 1: Traditional communication system based on phone number

Traditional telephone call and SMS messages as shown in FIG. 1, user can use many communication terminal devices which have call function unit, such as feature phone 1, smart phone 2, fixed phones 3, Smart watch which have call function 4, cordless phone, etc.; but calls between users, only through each other's telephone number, or phone short number; traditional communication system does not recognize characters except numbers.

Communication network 5, responsible set up communication connect between two or more communication terminal devices through various techniques. The various techniques of communication network 5, including but not limited to, various wired telephone network and wireless telephone network: such as cellular telephone network, GSM, EDGE, W-CDMA, CDMA, TDMA, LTE, WiFi, Wi-Max, VoIP, 3G, 4G, 5G, and all kinds of future communication techniques and protocol.

Traditional text messages and calls, based on two points, one is the strongest relationship chain between people, the other is telephone number ID system.

This present invention establish "telephone name resolution system" above traditional telephone number ID system; that the "telephone name resolution system" have multi-attribute, multi-level, multi-switch; and it base on unique true identity. It is somewhat similar to DNS (Domain Name System) on the Internet, but it is more comprehensive, more systematically. Because DNS domain name system only set a one-to-one binding mapping between domain name and IP addresses.

Figure 2:
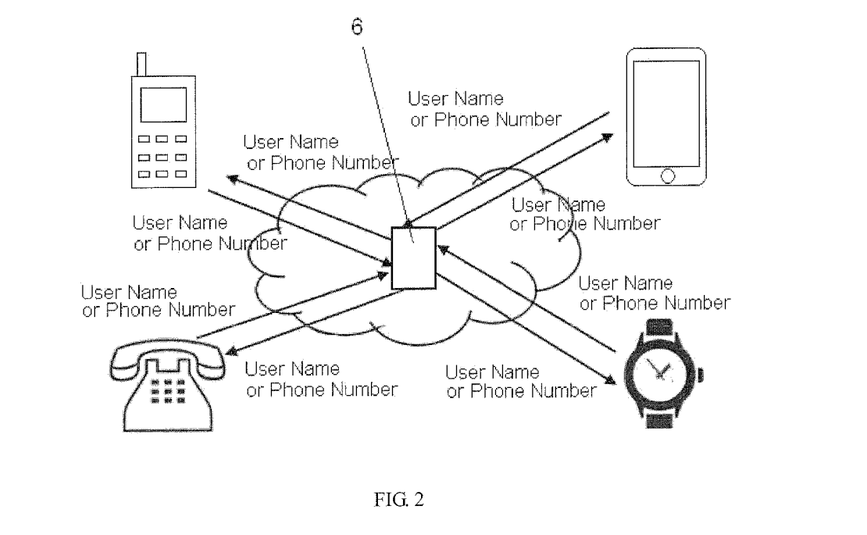
FIG. 2: This present invention communication system, which have "telephone name resolution system"

FIG. 2 is a schematic diagram of this present invention communication system, which has "telephone name resolution system". There is a "telephone name resolution system" 6, put up on the existing communication network 5.

Figure 4:
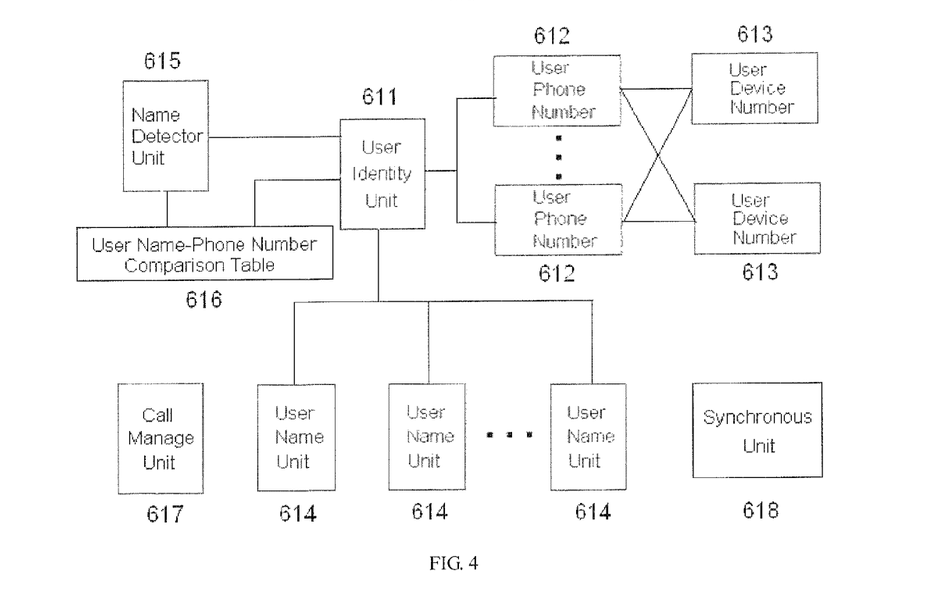
FIG. 4: Structure of "telephone name resolution system"

As shown in FIG. 4, "telephone name resolution system" 6, comprising "user identity management unit" 611, "user telephone number unit" 612, "user device number unit" 613, "user name unit" 614, "user name detect unit" 615, "user name-user telephone number comparison table" 616, "phone call management unit" 617, and "synchronization unit" 618. 611 to 618 are in the server of communication network, communication network including wired networks and wireless networks.

"user identity management unit" 611, managing a variety of user's identity attributes. User identity attributes include, but are not limited to: whether the user pass real identity authentication; user phone number issued organization (Telecom operators companies, wholesalers, retailers, etc.); type of user phone number (adult phone number, minors phone number under guardianship, elderly phone number, public service phone numbers, enterprise phone number, government departments phone number, news media phone number, etc.); user name, age, gender, place of birth, current residence, marital status, hobbies, user state, whether willing to answer the phone call, and so on. Some user attributes, the system automatically resolve related information, user can't set by themselves, or change arbitrary; but user can choose public or privacy, display or hide, choose what people public to, choose what people closed to. When a user use his identity card, apply for telephone number from telecom companies, "telephone name resolution system" automatically resolve and generate user's real name, age, gender, date of birth, place of birth, current residence, a default avatar, etc. Which real name, age, and gender etc., can't change by user (in the case of provide new ID card, can change), user can make changes such as current residence, default avatar, etc.

Personal authentication can use these credentials: identity cards, student ID cards, work permits, driver's license etc.; enterprises, governments, schools, organizations authentication can use these credentials: business license, organization code certificate, official seal, etc. So that whether landline fixed phone number or mobile phone number, each phone number will has a identity authentication mark, or does not have a identity authentication mark. When consumers receiving a phone call, he will know this phone credible or not credible, allow consumers to stay away from all kinds of harassing phone calls, harassing text messages, fraudulent phone calls, avoiding deception.

"user identity management unit" 611, distribute each user one or more "user telephone number unit" 612, each "user telephone number unit" 612 assign one or more "user device number unit" 613. One user telephone number can use on different user communications terminal devices. "User device number unit" also can assign one or more "user telephone number unit". User can use one or more telephone number on a same communications terminal device, dual card dual standby. "user device number unit" 613 including but not limited to: IMEI, SIM, device model, equipment serial number, WiFi address, Bluetooth address etc.

"User identity management unit" 611, comprising one or more "user name unit" 614, which accept user edits (create new, input, modify, delete, etc.). "user identity management unit" 611, also manage user name and login password (the password can also be any type of biometric technology, such as fingerprint identification, etc.). "telephone name resolution system" contain and manage all user's data, including the users who using telephone name resolution service, and who not using telephone name resolution service. Each user who using telephone name resolution service, be granted a user name from "user identity management unit" 611, and user create a login password; user can use this user name and login password login in "user name unit" 614 of "telephone name resolution system". "user name unit" 614 also can be called personal home page, or personal telephone name resolution homepage. This "user name unit" 614, user can directly access and edit the personal home pages on the server of "telephone name resolution system" (the cloud), and then synchronized to user's communication terminal device from the cloud; user also can edit on user's communication terminal device (the terminal), and then synchronized to the server of "telephone name resolution system".

After user login in "user name unit" 614 use his user name and login password, "user name unit" 614 comprising a plurality of editable items accept user edit. User can set one or a plurality of "user name unit" 614, each one suitable different occasion, and different situation. And each one has different custom attributes such as name, nickname, avatar, hobbies, company, occupation, skills, etc. Each one is similar to personal home page of Facebook or other social networking profile page. User can set up public property of each editable item, for example public to everyone, closed to everyone, and public to a specific person or a plurality of specific persons, such as person in address book, people user follow, people following user, user setting friends, user family, user setting close friends, user setting schoolmates, etc.

All user names unit 614 can share a same password, or each "user name unit" 614 has a different password. Each "user name unit" 614, is similar to a separate, virtual identity with a personal home page.

User custom setting each "user name unit" 614 correspond and linked telephone number. User only can linked their own phone number, not allowed to linked to other people's phone number.

"User identity management unit" 611, generate a personal subset of "user name-user telephone number comparison table" base on user input, all personal subset add together is the complete works of "user name-user telephone number comparison table" 616. User who not using telephone name resolution service, in this user's personal subset of "user name-user telephone number comparison table", this user's user name that linked to this user's phone number is Null.

Figure 5:
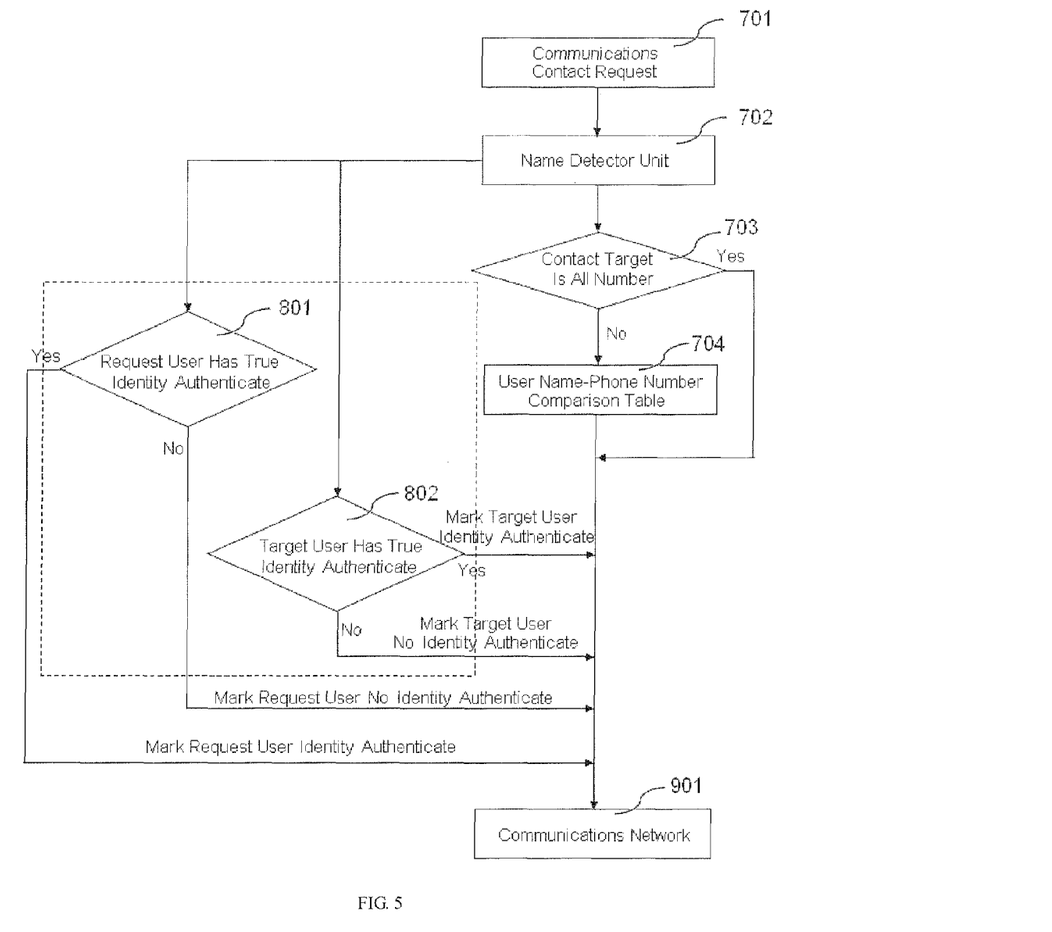
FIG. 5: Resolution procedure of user name and user telephone number, of present invention social communication system

When user want to set up communication connect with one or more other user, first access in the "telephone name resolution system" 6. "Telephone name resolution system" 6, generate one or more editable items of communication connect request information. As shown in FIG. 5, procedure 701 generate a communication connect request, base on all connection request information items input by user. Communication connect request information items, comprising request user information items, connection types of request connection, target user information items.

Type of request communication connect, include but are not limited to: telephone call, messages, view user's information, view user's personal home page, video calls, text chat, voice chat, multimedia file transport and share, email, search user by user name, search user by location, search user by age and gender, etc.

"Request user information" include but are not limited to: request user name, request user telephone number, request user photographs, request user status, request user location, request user communication status, request user identity validation information, request user age, request user gender, and all editable items or selected items in "user name unit" of request user.

"Target user information" include but are not limited to: target user name, target user telephone number, target user photographs, target user status, target user location, target user communication status, target user identity validation information, target user age, target user gender, and all editable items or selected items in "user name unit" of target user.

Procedure 702, access the communication connect request into "user name detect unit" 615. Procedure 703, "user name detect unit" 615, detecting if target user is all digital numbers. If the target user is all digital numbers, enter Procedure 901. Procedure 901 is access into existing communication network 5. From procedure 703 directly to procedure 901, is similar to existing traditional telephone call.

In procedure 703, If detected the target user is not all digital numbers, enter procedure 704. Base on user name, search "user name-user telephone number comparison table" 616, find the telephone number of the target user. Then, set up communication connect according to the telephone number of the target user. After procedure 704, enter procedure 901.

"User name detect unit" 615, detecting whether request user and target user, pass or not pass real identity authenticate; and the authentication type of real identity authenticate; according to "request user information" and "target user information". Detail procedure is, "user name detect unit" 615, send a identity authenticate request to "user identity management unit" 611. The identity authenticate request including request user's user name, or request user's telephone number; and target user's user name, or target user's telephone number. And "user identity management unit" 611, feed back the verification result.

As shown in procedure 801, if detect request user passed real identity authenticate, add a mark to request user, that shows he have passed real identity authenticate, during this communication. If detect request user not passed real identity authenticate, add another mark to request user, that shows he have not passed real identity authenticate, during this communication.

As shown in procedure 802, if detect target user passed real identity authenticate, add a mark to target user, that shows he have passed real identity authenticate, during this communication. If detect target user not passed real identity authenticate, add another mark to target user, that shows he have not passed real identity authenticate, during this communication.

Therefore, before the communication connect is set online, both sides can see whether the other party pass real identity authentication. For request user, know target user's credit level, will help to decide the style of this communication. For target user, know request user's credit level, will help to decide whether to turn on connect of this communication.

After the communication connect is set online, since both sides know, whether the other party pass real identity authentication. It will help both sides decide the content and style of this communication, base on other side's credit level. It will prevent lots of telephone fraud and social deception, and users have more protection.

As shown in FIG. 5, procedure 801 and procedure 802, surround by dotted line, has several meanings. One meaning is for efficiency and cost, these two steps can be omitted. After user finish his first complete real identity authentication, all "user name unit" create by this real identity, will get the mark of real identity authentication. Of course, as in FIG. 5, the most secure way is, every communication connect all detect authentication.

The other meaning is, telecom companies, only offer the user who passed real identity authentication these functions: dial-up base on user's user name, search user base on location, age, gender and so on. Incentive user who not pass real-name identity verification, to complete real-name identity verification steps.

As shown in FIG. 5, procedure 703, detecting if the target user is all digital numbers. If the target user is all digital numbers, use the digital numbers direct access into existing communication network 5. It is base on the naming rules, setting by "telephone name resolution system". Naming rules formulate user name, must contain at least one non-numeric characters. Such naming rules are simple, easy to operate. If the naming rules allow users to create a pure digital numeric name, the system will automatically detect all currently existing international and domestic telephone numbers and telephone short numbers, in all kinds of wired and wireless telephone. Only the combination of numbers, which don't conflict with existing global telephone number system, be allowed to use. Under this naming rule, there is a adding procedure, detecting pure digital numeric name, if it belongs to an existing global telephone number system's encoding rules. If it is, enter procedure 901; if not, enter procedure 704.

Social communication system of this present invention, comprising a type of new caller display protocols. Traditional caller ID display, only display the phone number of the incoming call. If user's address book in user telephone device, save this phone number before; then user telephone device display the corresponds saved name. If user's address book does not save this phone number before, then user telephone device only display numbers.

New caller display protocols, allow caller incoming calls, display Rich-Content contains any character, or pictures, sound, video and other multimedia content. New caller display protocols, also can called "communication connect request information standard protocol". The protocols support a unified standard Rich-Content format and Multimedia-Content format, of "request user information", "request connection type", and "target user information"; and support the unified standard format edit, transfer, and display on communications network and communications terminal.

Social communication system of this invention, comprising new contact address book software on communication terminal, new dial-up software on communication terminal, new message software on communication terminal. New contact address book software on communication terminal, containing a function, support edit, display, save the "user name unit" 614 on the communication terminal. New dial-up connection software, and new message software on communication terminal, support "communication connect request information standard protocol".

Figure 6:
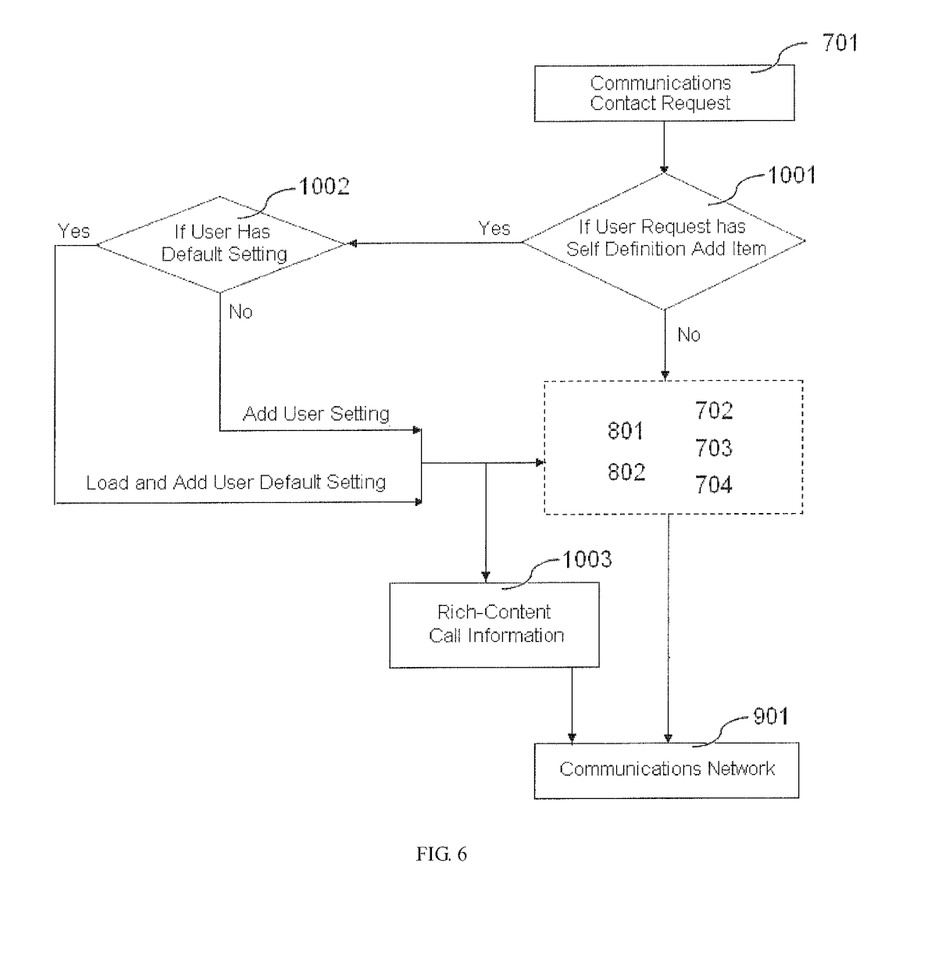
FIG. 6: New caller information display of this present invention social communication system

As shown in FIG. 6, when user need to set up communication connect with one or more other users, abovementioned procedure 701, procedure 1001 detecting request user's information items. If request user's information items contain editable items except request user's phone number. It also meaning detecting if request user has user-defined add items of communication require information.

If request user has no user-defined add items, continue the procedures in FIG. 5: 702,703,704,801,802; and then to procedure 901.

If request user has user-defined add items of communication require information, enter procedure 1002. Detecting request user's user-defined add items, if request user has default setting of added items. If has default setting, load the default setting of added items, and add this default setting to the display content (normal is caller incoming call's information display) of communication connect request. If request user does not use default setting, instead make a individually setting for this communication connect; add this individually setting to the display content of communication connect request.

Procedure 1003, add the default setting items or individually setting items, to the display content (caller incoming call's information display) of communication connect request. Expect abovementioned added items to the display content of communication connect request, other procedures according to normal procedures 702, 703, 704, 801, 802, as described hereinbefore.

The following is detail example for inventor, explain "new message" and "new phone call" scenarios. I use my identity ID card, apply for a mobile phone number from a telecom operators company, and get a mobile phone number "18800006666". Because I was using my own ID card, so telecom operators company, register me a real identity authentication user, in "user identity management unit" 611. Telecom operators company give me a login user name (usually the user's mobile phone number), and I set up my login password.

I use my login user name and my login password, login into "user name unit" 614. I create four "user name unit", as shown in Table 1 to Table 4, and linked these four user name to my mobile phone number "18800006666". In each "user name unit", I can create any new editable item, and setting public attribute to each editable item.

TABLE 1

| User name | Jiang HM |
|---|---|
| Linked phone number | 18800006666 |
| Avatar | Recent photo of life |
| Status | Beijing business trip |
| Photo album | Recent photos of travel |
| Lang message | Cook learning |
| Privacy | Family |

TABLE 2

| User name | KindTao Jiang HM |
|---|---|
| Linked phone number | 18800006666 |
| Avatar | Occupational photo |
| Company | KindTao technologies |
| Title | Founder & CEO |
| Web | www.kindtao.com |
| Privacy | Colleague, Occupational |

TABLE 3

| User name | Seven |
|---|---|
| Linked phone number | 18800006666 |
| Avatar | Favorite star |
| Status | Sunday Basketball |
| Photo album | Classmate reunion |
| Short message | Jordan |
| Privacy | Classmate |

TABLE 4

| User name | Time waterfall |
|---|---|
| Linked phone number | 18800006666 |
| Avatar | Waterfall landscapes |
| Age, Gender | Male, 38 |
| Hobby | Movie, Music |
| Short message | Time river |
| Privacy | All people |

"user identity management unit" 611, generate my personal subset of "user name-user telephone number comparison table", base on my created user name and setting linked phone number. As shown in Table 5.

TABLE 5

| User name | linked phone number |
|---|---|
| Jiang HM | 18800006666 |
| KindTao Jiang HM | 18800006666 |
| Seven | 18800006666 |
| Time waterfall | 18800006666 |

Of course, in addition to Table 1 to Table 4, I can create any number of new "user name unit". I also can delete "user name unit", such as Table 1 to Table 4. I also can create, edit, and delete any editable items list in Table 1 to Table 4. "user identity management unit" 611, will automatically updates my personal subset of "user name-user telephone number comparison table"; base on my operators in "user name unit" 614.

When I called my father, mother and other relatives, in dialing action, appear request user information item, and I choose default user name "Jiang HM", and it's information: user name, phone number, avatar, status. This telephone call, first access to "telephone name resolution system", system check the options of this call request information; go through procedure 1001, and procedure 1002; add items in Table 1 to display content of caller information, show in procedure 1003, then call my father's phone number. When my father heard the phone ringing, on his mobile phone screen, it appears my latest photo of life, my name "Jiang HM", my phone number, status is in Beijing on a business trip. After this call, my father can direct save these information to his mobile phone, he does not need to input. He can modify the default Notes name "Son." Of course, I can choose video call with my father, or send text messages.

I went to Beijing on business, attend an industry conference meeting. At lunch, meet many new friends within the industry. I asked a new friend's phone number, I use mobile phone to dial the number; during dialing, I chose to public my "user name unit" "KindTao Jiang HM" to him. When his phone ringing, his phone's screen, will display the content in Table 2. New friend click save, these informations automatically save to his cell phone, he does not need input letter by letter. After he finished, he can dial back my phone or reply a text messages to me, and he choose to public his Occupational "user name, unit" to me, during his dialing or messaging. Then, his name, company, title, company web, ect, will automatically display on my phone's caller or text messages, I only need click save. When people know each other, exchange their phone numbers, no longer need input to mobile phone letter by letter. Even directly replace swap business cards.

"telephone name resolution system" 6, comprising "phone call management unit" 617. "phone call management unit" 617 have option of configure phone calls. For each "user name unit" 614, user can configure whether telephone is closed, and off line time; whether standby, and standby time; whether push user status etc. For each "user name unit" 614, "phone call management unit" 617 can configure these five option: set up communication connect, accept communications connection, block communications connection, disconnect communication connect, save communications content; and each option's time range, location range, type range, and target range.

After lunch, the afternoon session began, I set my phone state to the "meeting", and this meeting relatively high level, I set to a high-level meeting, which my default option is only my families can calling in.

In this case, the "telephone name resolution system" will auto push my state in "meeting", to all phone numbers who I choose public state. For example, I choose public state to families, colleagues, classmates; their contact address book in phone, view my name, automatically display my state is in a high-level meeting.

In this case, if people who I don't choose public state, call me, the "telephone name resolution system" will auto prompted, that I am in the "non-contact state" (can not connect), please call again two hours later. Only after my meeting, they can call in. Of course, after meeting, I'll receive missed calls details of the period, select reply priorities. I set my phone state to normal state after meeting. Then the "telephone name resolution system" will automatically send text messages, to inform people who call me during my meeting, I am currently in the "contact state" (can be connected).

On the way back to the hotel at night, I launched a group chat, recently some university classmates wants to make a party. I use the "user name unit" "Seven", content of Table 3, send a group chat invite to classmates in my address book. "Seven" is nickname when I was in college. My classmates accept the invite, and join the group chat, text chat, upload recently photos, voice chat, and video chat. At this time we regret that a classmate "Tony", lost contact, we all can not contact him. Because his phone number has changed. I'm a real identity authenticated user, so I can the function: search new user by name. I click search user button, in my address book software. As shown in FIG. 5, procedure 701; set up a communication connect request of search new user. The "telephone name resolution system" 6, detect my user type first, if I have this function limit. If I do not have this service, remind me I have limit of this service. In General, this service is turned off for non-real identity authenticated user. I'm a real identity authenticated user, so I have this service, it prompt I input the search content. I input "Tony" to search, system feedback, there are more than 200 named "Tony". I know Tony in Beijing, so I add a search option by location. I input "Beijing", system feedback, there are 18 users named "Tony" in Beijing. If Tony set public avatar on his public home page of "user name unit" "Tony"; I can find him by avatar directly. If he does not public his avatar, but has public his age or other items. I can further narrow the focus by age. If he public nothing, except a name; I can send a mass message communication connect request, to all these 18 users named Tony. The message is "I am Jiang HM, xx university xx class, are you in this class?". And use my name and my avatar as the request user's information, for this mass message communication connect request. Tony saw the message, reply to me; so the party nobody missed.

Tony can set his search privacy option, in his "user identity management unit" 611, or in his "user name unit" 614. Tony can set any user can search him through name "Tony"; or set only real identity authenticated user can search him; or only setting age user, setting location user, and other setting conditions can search him; or nobody can search him. If he set nobody can search him, then I can't find him.

"phone call management unit" 617, can configure call options of each "user name unit" 614. It can configure the time of dial-up out, configure the time of accept call in, configure accept callers, configure the time of accept message, configure accept users who sending messages, configure message send out time, configure the save time of send out message. Also can configure each "user name unit" 614, online or offline; have time or busy; login out this user name. Also can configure to any other user, block, add to blacklist, report police.

The new messaging system, I can configure each message is send out immediately, or send out one hour later, or set the specific time to send out. Also can configure, delete the message within minutes after send out; or delete one week later. A colleague recently caught a cold, I sent a voice message, "remember to take medicine and drink more water", and set it automatically send to him, every morning eight o'clock, every evening eight o'clock, in the next three days "telephone name resolution system" 6, also can search new user based on geographic location.

After dinner, I went to a nearby coffee shop. A graceful beauty girl sit next to my table, reading a poetry collection which I also liked. I take out cell phone, search nearby users, one of them named "Dancing in breeze", public avatar is a "Ancient Ladies", 28 years old, loving poetry, photography, travel, and has a real identity authenticated mark. I choose my "user name unit" "Time waterfall", send a message to "Dancing in breeze". Because both of us set not public phone number in public user name. So "telephone name resolution system" auto hidden our phone number, just use our nickname, launched a chat.

As shown in FIG. 5, procedure 701, I use nickname "Time waterfall", to the target user "Dancing in breeze", launched a message communication requests. Communication requests through procedure 702, "user name detect unit" 615, procedure 703 detect "Dancing in breeze", is not all digital numbers. Then enter procedure 704, find the corresponds phone number of "Dancing in breeze", in the "user name-user telephone number comparison table" 616. And use the found corresponds phone number access into the communication network, complete this communication connect request.

"User name detect unit" 615, send a identity authentication request, to "user identity management unit" 611, as shown in procedure 801, verified request user "Time waterfall" has passed real identity authenticate, then add a real identity authentication mark to "Time waterfall", in this communication connect. As shown in procedure 802, verified target user "Dancing in breeze" has passed real identity authenticate, then add a real identity authentication mark to "Dancing in breeze", in this communication connect. "Dancing in breeze" received three messages from strangers. One is from a named "Rich", has a handsome avatar, and typical rich man living pictures, but has no real identity authentication mark. That is the person's phone number does not passed real identity authenticate. She choose direct ignore this kind of irresponsible people.

One is from a named "Tom cat", "Tom cat" has real identity authentication mark. "Dancing in breeze" has quite a good impression to "Tom cat". "Tom cat" invite she go to movie at night. She call "Tom cat", the "telephone name resolution system" auto resolute "Tom cat" to the linked phone number, and dial-up the linked phone number. "Dancing in breeze" asked his phone number in the call. Then "Dancing in breeze" dial the asked phone number, the voices are not from a same person, she hung up. Someone use another's authenticated phone number, want to meet she at night. She add "Tom cat" and the asked phone number to blacklist. Then, whatever use nickname "Tom cat", or use the linked phone number of "Tom cat", or use another asked phone number, can't contact "Dancing in breeze" any more. These three will all blocked by "telephone name resolution system" automatic.

If a user be added to blacklist, or be reported police, by setting number of real identity authenticated users, "telephone name resolution system" 6, will stop this user's phone number communication for a set time, or forever disabled. Unless the person holds the relevant documents apply for open again. At the same time, recorded in this person's "user identity management unit" 611, in the number of be added to blacklist or be reported. This person establish any communication connect with any user, procedure 801 or procedure 802, will add the number of be added to blacklist or be reported, to communication connect request information, such as procedure 1003. Even a user be reported by setting number of real identity authenticated users, "telephone name resolution system" 6, will automatic alarm and call police. For example, if there are more than three real identity authenticated users, add a person to blacklist, the system disabled this person's phone number one week. If more than five users report a person, the system automatically alarm and call police.

Then I send a message to "Dancing in breeze", 'I like poems too'. She looked at me, still a bit anger of Tom cat: "You number?". I gave her, she dial-up 18800006666, my cell phone rang; she hung up, and dial-up "Time waterfall", my cell phone ringing again. She smiled, and we became good friends.

The "telephone name resolution system" 6 also comprising groups function, such as friends group, career group, classmate group, and so on.

Recently mobile payment is very hot, so I click career group button in my contact address book software, Join career group require public my real name, company, job title, skill, and so on. I submit my "user name unit" "KindTao Jiang HM", content of Table 2. After approval, I joined the career group.

I input "mobile payment" search, it will display all related person. I input keyword "MasterCard" or "PayPal", search relevant person. I send self introduction message to them, to add friend. If they are interested, accept my friend request, I can contact him, send messages, voice or phone call. If the other side is not interested, do not add me as a friend, then I will not be able to contact him. Career group service can be charged.

A lot of people in order to work and life balance, use two phone numbers, one for work, one for life. But in fact, work phone number still be disturbed at any time when it turn on. I did not use two phone numbers, with only one phone number. I use "user name unit" "KindTao Jiang HM" for work. Other people don't need to know my phone number, they can directly dial-up or message to "KindTao Jiang HM". I can configure in "phone call management unit" 617, auto login out the user of "KindTao Jiang HM" every evening after eight o'clock. Next day deal with the related communication requests during night. I also can configure only several specific person can contact me every evening after eight o'clock, and shield any other person's communication requests.

In this way, many people would not have to bought two cell phones for work and life, or buy dual SIM card dual standby mobile phone, increasing costs. For telecom operators companies, also reduced the double card issuance costs, management costs.

In "telephone name resolution system", you can have multiple binding attributes, multiple binding social relationships, multiple binding nicknames. Each incoming call or message, "telephone name resolution system", will display the request user's public attributes. That is the "telephone name resolution system", automatic real-time generate personal page, according to both side real-time communication user information, base on "New Call" and "New Message" both side real-time attributes switch. This is a more advanced social communication system than Facebook, WhatsApp, WeChat, Twitter, etc. Each person, each time, see your personal page is different. Every communication connect request, that I accept, contains other side's request user information, and request which my "user name unit", and which communication type other side want to set up.

Every message I received, every phone call I received, can be career friend who show real name, company, title; can be a ordinary person who has not any information but a phone number; can be fixed telephone number display the Inland Revenue Department; can be a stranger who display "Dancing in breeze". Anyone whether send message or dial-up to my telephone number, or to "Jiang HM", or to "KindTao Jiang HM", or to "Seven", or to "Time waterfall", all real-time to my phone number (except custom setting of "phone call management unit" 617).

Career group and classmate group have skill items, others can score on these skills items. Everyone can submit their skills items, such as the programming, mathematics, English, manual, painting, piano, sports, volunteer work and so on. Each specialty items or skills items of each person, there is a qualitative rating such as praise or negative, or there is an amount rating such as score or values.

The content of the "New Message", can configure to any public range, can custom to any length. If the new message is longer than 300 words, and public range configure to public to all user, it is similar to a blog, for example, Lang message in Table 1. If the new message is less than 300 words, and public range configure to public to all user, it is similar to a Twitter. If the new message public range configure to public to several specific users, it is similar to a mass messages.

"synchronization unit" 618, synchronize the "user name unit" 614 in server and the "user name unit" 614 in user's communication terminal devices; synchronize user's contact address book in server and user's contact address book in user's communication terminal devices. Synchronize user state to another one or more users, who the user select public state to, and who also accept the user's status update.

Figure 3:
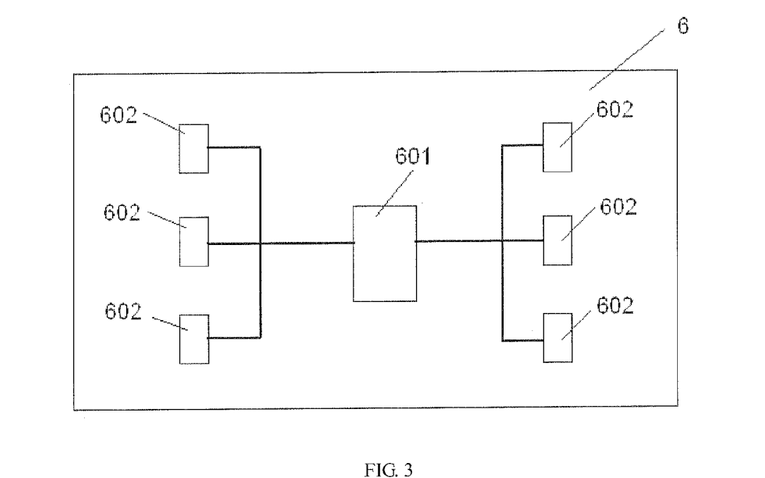
FIG. 3: Server distribute of "telephone name resolution system"

As shown in FIG. 3, in order to increase efficiency and speed, the "telephone name resolution system" can have multiple servers, can contain one or more root server 601, and a plurality of mirror servers 602.

The "telephone name resolution system" in this paper, also can be called "telephone number-name resolution system", or "telephone name-number resolution system", or "telephone name-telephone number resolution system", or "telephone number personal domain name system". The "user name unit" 614 in this paper, also can be called "user telephone name unit".

If the DNS domain name system is one of the core functions of the Internet, is an essential cornerstone of the Internet. Then the "telephone name resolution system" is one of the core features of the next-generation communications networks, is the indispensable cornerstone of social communication network. If Yahoo is Web1.0, Facebook/iMessage/Twitter/WhatsApp is Web2.0. Then, the traditional communication network is Telecom1.0, social communication network which have "telephone name resolution system", is Telecom2.0.

Specific layout, mode, operation, according to the idea of this present invention, are within the scope of protection of this present invention. Replacement and transposition of the abovementioned examples' location, quantity, type etc.; are within the scope of protection of this present invention.

Those skilled in this field can understand: the above description is only a preferred embodiment of the present invention, but not to limit the present invention. For the skilled technicians, can modify the technical solutions, or replacement some technical features. Any modification within the spirit and principles of this present invention, are within the scope of protection of this present invention.

The invention claimed is:

1. A social communication system, comprising a "telephone name resolution system", parsing user name to corresponding phone number, or parses telephone number to corresponding user name during communication, and communication connect first access to "telephone name resolution system";
    "telephone name resolution system" comprising "user name unit", "user name unit" accept user edit; each user create one or a plurality of "user name unit" for their each own telephone number; each "user name unit" comprising one or a plurality of editable items, each editable item comprising one or a plurality of attributes;
    "telephone name resolution system" gathering every user's "user name unit", and generate "User Name-User Telephone Number Comparison Table";
    "telephone name resolution system" comprising "user identity management unit", "user telephone number unit", "user device number unit", "user name unit", "user name detect unit", "user name-user telephone number comparison table", "phone call management unit", and "synchronization unit";
    "telephone name resolution system" bring in "communication connect information",
    "communication connect information" comprising: one or a plurality of editable items of "request user information"; one or more custom "communication connect type"; one or a plurality of editable items of "target user information".

2. The social communication system according to claim 1, wherein comprising procedures of communication:
    "telephone name resolution system" bring in "communication connect information",
    "telephone name resolution system" detecting if the target user is all digital numbers;
    if the target user is all digital numbers, use the digital numbers to set up a communication connect;
    if the target user is not all digital numbers, parsing target user name to corresponding telephone number, base on "user name-user telephone number comparison table"; and use the corresponding telephone number to set up a communication connection.

3. The social communication system according to claim 1, wherein comprising procedures of communication:
    "telephone name resolution system" bring in "communication connect information",
    "telephone name resolution system" detecting if request user has user-defined "communication connect request information" items, except request user's telephone number;
    if request user has no user-defined "communication connect request information" items, use telephone number direct set up a communication connection;
    "telephone name resolution system" detecting if request user has default setting of "communication connect request information" items;
    if request user has default setting items, load the default setting items of "communication connect request information";
    if request user has no default setting items, add the "communication connect request information" items, that user individually set for this communication connect request;
    display all user added "communication connect request information" items during communication connection.

4. The social communication system according to claim 1, wherein "request user information", comprising request user name, request user telephone number, request user photographs, request user status, request user location, request user communication status, request user identity validation information, request user age, request user gender, and all editable items or selected items in request user's "user name unit";
    "target user information", comprising target user name, target user telephone number, target user photographs, target user status, target user location, target user communication status, target user identity validation information, target user age, target user gender, and all editable items or selected items in target user's "user name unit";
    request "communication connect type", comprising telephone call, messages, video calls, text chat, voice chat, multimedia communication, search user, view user's information.

5. The social communication system according to claim 1, wherein the "telephone name resolution system" comprising "user identity management unit", store informations of user pass or not pass real identity authenticate;
    detecting whether request user and target user pass real identity authenticate, while set up a communication connect;
    and add a mark to request user and target user, show they pass or not pass real identity authenticate in this communication connection.

6. The social communication system according to claim 1, wherein user configure privacy attribute of each their own "user name unit", or separate set privacy attribute of each editable item of each their own "user name unit";
    privacy attribute comprising public to everyone, close to everyone, public to select contact people, public to one or a plurality of people who fit in with user set conditions.

7. The social communication system according to claim 1, wherein the "telephone name resolution system" comprising "telephone call management unit";
    "telephone call management unit" custom each "user name unit" these options: start communication, accept communication, block communication, disconnect communication, save communication content;
    and custom each option's time range, location area, type class, target scope, number of times, and frequency;
    "telephone call management unit" suspend, or completely block all communication connect of a user who are dragged to blacklist, or are reported crime by other over setting number users;
    "telephone call management unit" also automatic call the police, and record number of times be dragged to blacklist, be reported crime, and be called the police, to this user's "user identity management unit".

8. The social communication system according to claim 1, wherein have function of search user by location, by age, by gender, by user identity attribute;
    and have function of user evaluate and score each other.

9. The social communication system according to claim 1, wherein the "telephone name resolution system" comprising "synchronization unit",
   synchronization "user name unit" on server and "user name unit" on user's terminal device;
   synchronization user contact address book on server and user contact address book on user's terminal device;
   synchronization user's status to one or more other users, who are this user choose to public state, and also set to accept this user's update status.

10. The social communication system according to claim 1, wherein the social communication system, comprising standard protocol of communication connect information, standardize Rich-Content and Multimedia-Content of "request user information", "communication connect types", and "target user information"; and standardize these Rich-Contents and Multimedia-Contents unified standard format during edit, transmission, and display, both on communication network and communication terminal.

11. The social communication system according to claim 1, wherein the social communication system, comprising new contact address book software on communication terminal, new dial-up software on communication terminal, new message software on communication terminal;
   new contact address book software on communication terminal, comprising function of edit, display and store "user name unit" on communication terminal;
   new contact address book software, new dial-up software, and new message software on communication terminal support standard protocol of communication connect information; new message software, support set each message public scope and set each message length.

* * * * *